United States Patent

[11] 3,575,649

[72] Inventor Joseph W. Mathews
 3762 Swansea Drive, Mobile, Ala. 36608
[21] Appl. No. 858,942
[22] Filed Sept. 18, 1969
[45] Patented Apr. 20, 1971
 Continuation-in-part of application Ser. No.
 542,116, Apr. 12, 1966, now Patent No.
 3,469,163.

[54] MOVING COIL DIRECT CURRENT RECIPROCATING MOTOR
 16 Claims, 17 Drawing Figs.
[52] U.S. Cl. .................................................... 318/127,
 318/132, 310/27
[51] Int. Cl. .............................................. H02k 33/18
[50] Field of Search .......................................... 318/119-
 —135, 331; 310/13, 27

[56] References Cited
 UNITED STATES PATENTS
 3,469,163 9/1969 Mathews ..................... 310/27X Primary Examiner—D. F. Duggan
Attorney—Giles C. Clegg, Jr.

ABSTRACT: A direct current motor having a coil moving in a magnetic field to provide reciprocating motion and a circuit for controlling the flow of current through the coil, including a transistor connected in series with the coil and a DC source. A capacitor whose state of charge varies as a function of the back e.m.f. generated by the coil is connected for controlling the conductivity state of the transistor as a function of the capacitor's state of charge.

PATENTED APR 20 1971 3,575,649

INVENTOR
Joseph W. Mathews

BY

ATTORNEY

Fig. 5  Fig. 6  Fig. 7  Fig. 11

INVENTOR
Joseph W. Mathews

BY
ATTORNEY

INVENTOR
Joseph W. Mathews

BY *[signature]*

ATTORNEY

INVENTOR
JOSEPH W. MATHEWS

ATTORNEY

MOVING COIL DIRECT CURRENT RECIPROCATING MOTOR

CROSS REFERENCE TO RELATED APPLICATIONS

This application is a continuation-in-part of my copending application Ser. No. 542,116, filed Apr. 12, 1966, now U.S. Pat. No. 3,469,163.

BACKGROUND OF THE INVENTION

The present invention relates to direct current motors and more particularly to an improved direct current motor which utilizes electromagnetic forces to produce reciprocating motion of a force transmitting member.

The present invention provides a brushless motor that is capable of converting low voltage direct current energy into reciprocating mechanical energy at a relatively high efficiency. In accordance with the principles of the present invention, there is provided a permanent magnet having an airgap that receives a coil. The coil is supported for oscillatory movement relative to the permanent magnet. Either the coil or magnet can be supported by the frame of the motor with the other moving relative thereto, although considerations including the relative mass of the coil and magnet renders it desirable that the coil be supported for oscillatory movement relative to the permanent magnet.

There is also included a control circuit for applying direct current to the coil with the current flowing in a direction to produce magnetic flux that interacts with the magnetic flux associated with the permanent magnet to produce a force to move the coil longitudinally along the axis of the coil in one direction relative to the airgap. The control circuit includes means effective to cause the current flowing in the one direction to be greater as the coil moves in the one direction from an initial position than as the coil is returned to the initial position. There is also included means for controlling the excursion of the coil as it moves and tending to return to the initial position.

In accordance with the preferred embodiment of the invention, the coil is of cylindrical configuration. The coil is supported such that it is free to move axially in the airgap and any movement normal to its axis is restricted in order that the length of the airgap may be minimal yet permit acceptance of the coil. Further, in accordance with the preferred embodiment of the invention, a transistor which is controlled responsive to the back e.m.f. (electromotive force) generated in the coil is utilized for selectively applying pulses of direct current to the coil to produce the desired motion. A preferred control circuit is one characterized by elements of instability in the event of stalling of the motor or in the event the motor should stop with the coil in a position of extreme excursion of its movement, assuring that the motor will be capable of starting at any position without regard to the fact that it is in effect a single piston device.

Many objects and advantages of the invention will become readily apparent to those skilled in the art as the following detail description of a preferred embodiment of the same unfolds when taken in conjunction with the appended drawings wherein like reference numerals denote like parts and in which.

Turning now to the drawings, a motor in accordance with the preferred embodiment of the invention is designated generally by the reference numeral 10. It includes a magnetic structure 12 and a coil 14. Two rod members 16 and 18 depend from the lower surface 20 of the magnetic structure 12 and support plate members 22 and 24. The electrical components utilized in the control circuitry are suitably mounted on the plate member 22, but are not shown in FIG. 1 of the drawings, as to do so would unduly complicate the drawing. A pair of batteries 26 and 28 are mounted to the plate member 24 by bracket assemblies 30 and 32, respectively. Batteries 26 and 28 are preferably of the nickel cadmium type in order that they may be recharged and suitably are connected in series such that the voltage available to drive the motor is approximately 2.5 volts. It will be appreciated that as many batteries as are required to obtain a desired voltage level can be provided and that voltages greater than 2.5 volts can be used.

Figure 1:
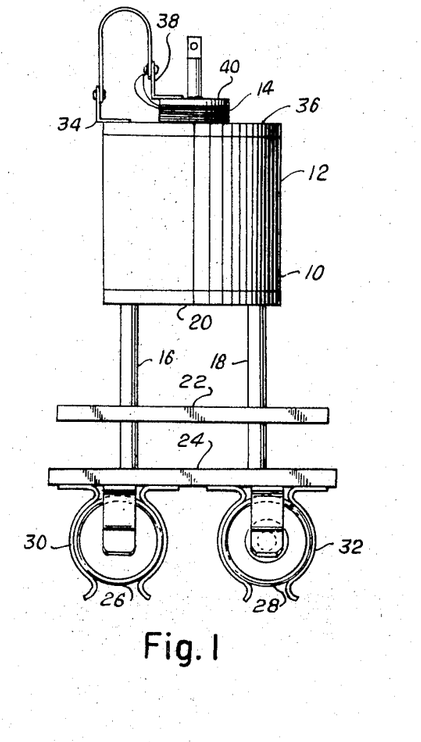
FIG. 1 is a side elevation view of a preferred embodiment of the present invention.

An L-shaped member 34 is mounted to the upper surface 36 of magnetic structure 12 and, similarly, an L-shaped bracket member 38 is mounted to the upper surface 40 of coil 14. Extending between bracket member 34 and bracket member 38 is a pair of resilient conductor members 42 and 44, suitably formed of beryllium copper. Bracket members 34 and 38 are suitably formed of an insulating material at the points of contact with the members 42 and 44. Electrical conductors (not shown) extend from the bracket member 34 to the electrical control circuitry mounted on the plate 22, one of the electrical conductors contacting each of the members 42 and 44, respectively. One end of coil 14 is connected to the member 42, the other end being connected to member 44. Electrical connection is, therefore, provided between the coil 14 and electrical control circuitry.

Figure 2:
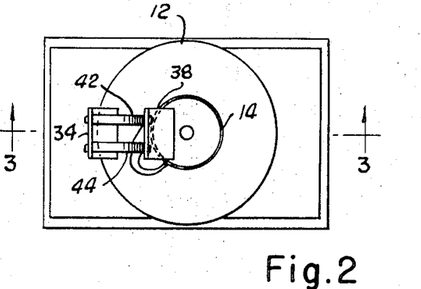
FIG. 2 is a plan view further illustrating the motor of FIG. 1.
Figure 3:
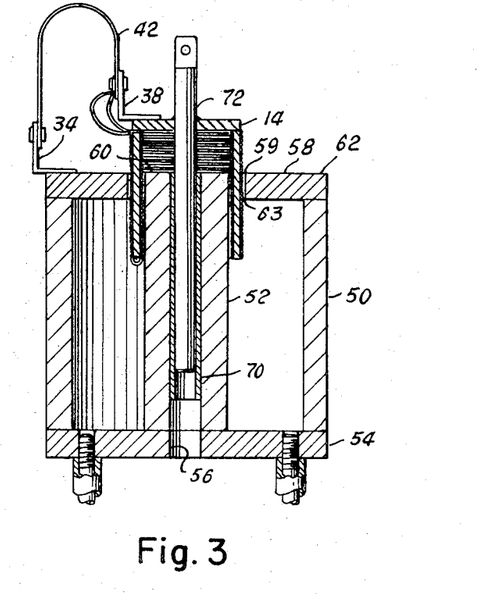
FIG. 3 is a cross-sectional view taken along line 3—3 of FIG. 2.
Figure 4:
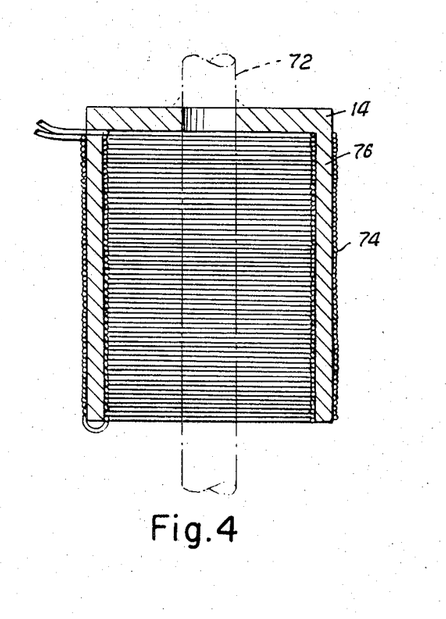
FIG. 4 is a view similar to FIG. 3, but illustrating the coil in accordance with the preferred embodiment of the invention in enlarged form.

As best shown in FIG. 3, the magnetic structure 12 suitably comprises a first cylindrical member 50 and a second cylindrical member 52 whose outside diameter is substantially smaller than the inside diameter of the cylindrical member 50. There is also provided a first annular member 54 whose outside diameter is substantially the same as the outside diameter of the cylindrical member 50 and whose walls are substantially the same thickness. Annular member 54 includes an annulus 56 of substantially the same diameter as the inside diameter of the cylindrical 52. Cylindrical members 50 and 52 are mounted onto the annular member 54 such that the opening of the cylindrical member 52 is aligned with the annulus 56 of annular member 54, with cylindrical member 50 concentrically surrounding the cylindrical member 52. There is also provided a second annular member 58 having an outside diameter of substantially the same as the outside diameter of the cylindrical member 50. The annular member 58 includes an annulus 59 of slightly greater diameter than the outside diameter of cylindrical member 52 and of a thickness substantially the same as the thickness of cylindrical member 50. The cylindrical member 52 is suitable of greater length than cylindrical member 50 by an amount equal to the thickness of annular member 58 such that when the elements of the magnetic structure 12 are arranged as shown in FIGS. 1—3, the upper end 60 of cylindrical member 52 will lie in substantially the same plane as the upper edge 62 of the annular member 58. The diameter of the annulus 59 is greater than the outside diameter of cylindrical member 52 by an amount equal to twice the desired width of the air gap 63 in which the coil 14 moves. The elements of the magnetic structure 12 are all preferably of a permanent magnetic material or a material having a high permeability, such as soft iron. Generally, it is preferred that the element 50 be of permanent magnetic material and the elements 52, 54 and 58 be of soft iron when minimum piston size and weight, low vibration, high speed and low torque are required. If greater torque is required, it is preferred that the part 52 be of permanent magnetic material for a given airgap and weight of magnetic material. A bearing 70 is positioned within the cylindrical member 52 for receiving a shaft 72. As best shown in FIG. 4, the windings 74 of the coil 14 are wound on a cylindrical coil form 76. Coil 14 is mounted onto the shaft 72 with shaft 72 being coaxial with coil 14. When shaft 72 is inserted into bearing 70, at least a portion of the coil form 76 will extend into the airgap 63. As current is caused to flow through the winding 74 of the coil to produce a magnetic field that interacts with the magnetic field within the airgap of the permanent magnet, the coil will move into the airgap, carrying shaft 72 with it. The direction of movement is, of course, determined by the direction of current flow for a given magnetic polarity. If a large number of ampere turns is produced by current flow through the coil, demagnetization of the permanent magnet can occur unless the coil moves into the structure as the current flows.

As the coil moves in the airgap with the motor running, it will reach a point of desired maximum excursion and must be returned to the opposite point of maximum excursion. This can be accomplished in several different ways. For example, in some instances, it is practical to reverse the direction of current flow to permit flow of current in a direction to produce the flux that interacts with the lines of force of the permanent magnet to result in the coil being returned to its initial position. Alternatively, the coil form 76 can be formed of ferrous material such that reaction of the magnetic field of the magnetic structure 12 upon the coil form 76 will provide a restoring force. The contacts 42 and 44, in addition to providing electrical connection to the winding 74, can also function to bias the coil to the desired position. In most practical devices, however, the inertia of the driven member will be sufficient to restore the coil to the opposite point of maximum excursion. It is, therefore, possible to operate the motor in the absence of a restoring source of the general character described above.

Figure 5:
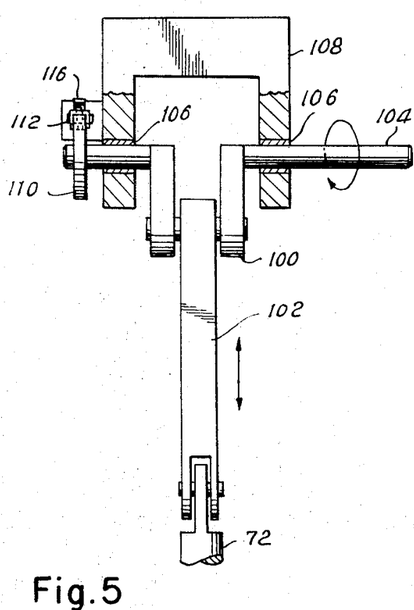
FIG. 5 is a front elevational view illustrating a crank mechanism suitable for changing rectilinear motion of the coil to rotational motion.
Figure 6:
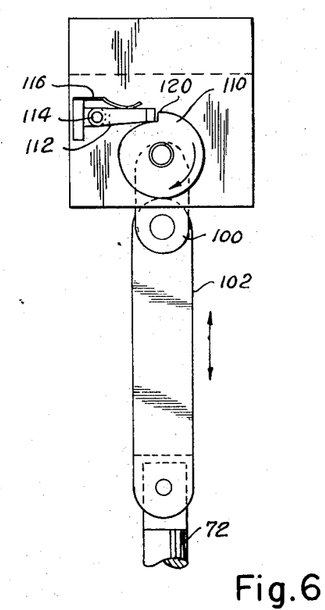
FIG. 6 is a side elevation view of the crank mechanism of FIG. 5.

The mechanical energy available as the shaft 72 moves can be used in many applications. Many applications require circular motion. The reciprocating, rectilinear motion of the shaft 72 can suitably be converted to a circular motion by coupling the shaft 72 to a cranking member 100 through linkage 102, as shown in FIGS. 5 and 6. Cranking member 100 is of conventional type wherein it comprises a shaft 104 that is journaled for rotation in bearings 106 which pass through the walls of a supporting member 108 of fixed position relative to the permanent magnet structure 12. To insure that rotation of the shaft 104 is always in the desired direction, a camming member 110 can be mounted to one end of the shaft 104. A dog 112 is pivotally mounted at 114 to member 108 with its free end traveling over the periphery of the camming member 110. A spring 116 is suitably provided for biasing the dog 112 against the surface of cam 110. It will be noted that cam 110 and dog 112 cooperate to permit rotation in a clockwise direction, as viewed in FIG. 6, but prevents rotation in the opposite direction due to the end 118 of dog 112 bearing against shoulder 120 of cam 110. It will be noted that the crank member also provides a very important function of limiting the maximum excursion of the coil.

Figure 7:
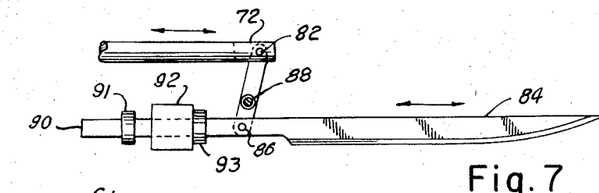
FIG. 7 is a view illustrating the manner in which the motor of the present invention can be utilized to drive a blade.

Reciprocating motion can be obtained by coupling to the shaft 72 either directly or through a suitable lever arrangement. For example, as shown in FIG. 7, the shaft 72 can be coupled to a knife blade 84 at point 86. Lever member 80 is suitably pivotally mounted about a centrally disposed point 88 such that movement of the coil away from the permanent magnet will cause the knife blade 84 to move in an opposite direction. The end 90 of knife blade 84 is suitably elongated and passes through a bearing member 92 which cooperates with lever member 80 to maintain alignment of the knife blade 84. Operation of the motor will, therefore, be effective to produce reciprocating motion of the knife blade 84, as would be suitable for cutting. Rings 91 and 93 limit the movement of the blade 84. However, use of the crank to control excursion, as described with reference to FIGS. 5 and 6, is preferred even when reciprocating motion is desired.

Figure 8:
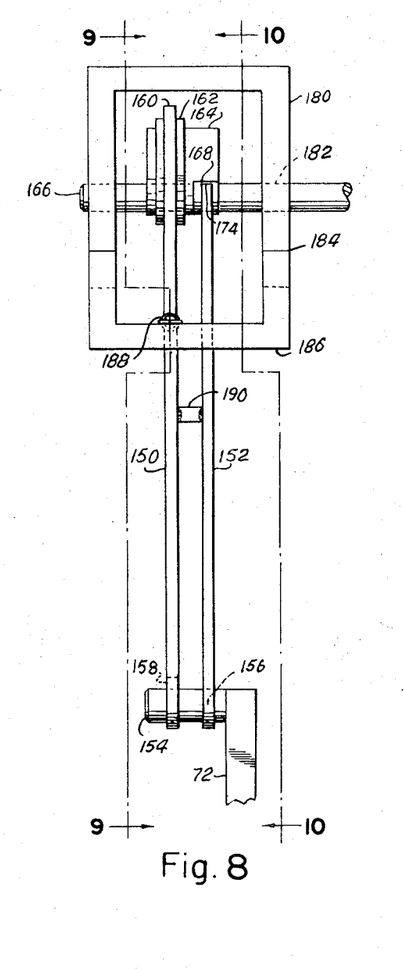
FIG. 8 is a front elevation view similar to FIG. 5 illustrating a different crank arrangement.
Figure 9:
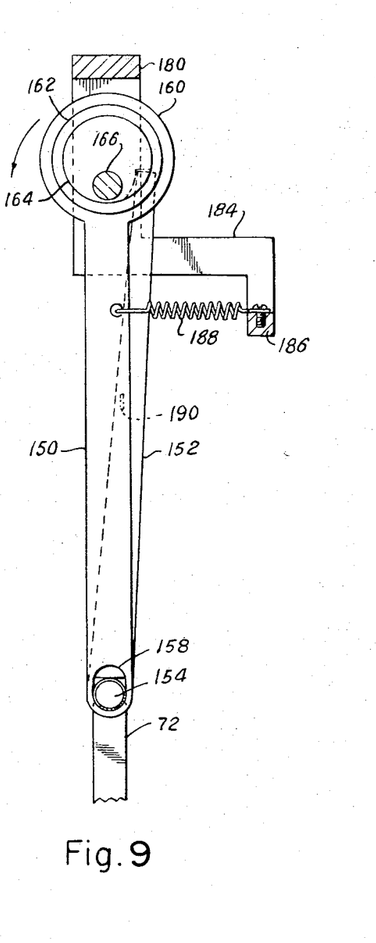
FIG. 9 is a view taken along line 9—9 of FIG. 8.
Figure 10:
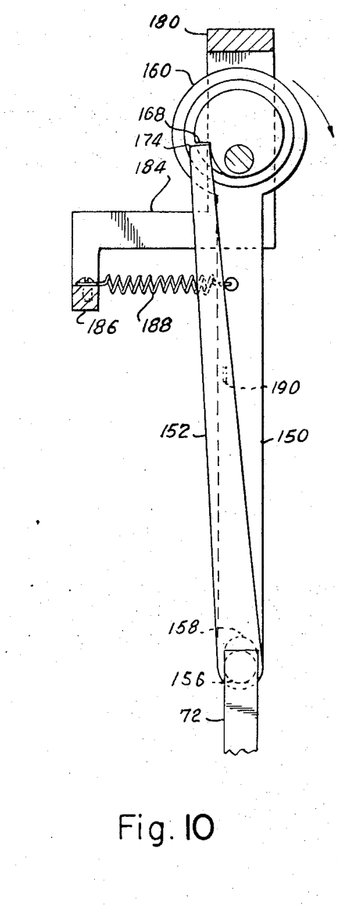
FIG. 10 is a view taken along line 10—10 of FIG. 8.

There is shown in FIGS. 8—10 of the drawings an alternative structure for converting the rectilinear motion of shaft 72 into circular motion. In the embodiment of the invention shown in FIGS. 8—10 of the drawings, provision is made for assisting starting of the motor at the bottom dead center position and also for preventing the motor stopping at the bottom or top dead center positions. The arrangement of FIGS. 8—10 of the drawings can be seen to comprise main connecting shaft 150 and an auxiliary connecting shaft 152, each of which are coupled at one end to the piston 72 by connecting pin 154. The pin 152 is journaled for rotation in hole 156 formed in the end of the auxiliary connecting shaft 152 and extends through slot 158 formed in the end of the main connecting shaft 150. The main connecting shaft 150 is enlarged at end 160 to define a circular sleeve which receives a bushing 162. The bushing 162 is journaled for rotation in the sleeve defined by the enlarged end portion 160 of the main connecting shaft 150. The bushing 162 is suitably press fitted onto a cylindrical member 164. The shaft 166 is eccentrically mounted to the cylindrical member 164, and suitably passes therethrough as shown. As best shown in FIG. 10, a notch 168 is suitably provided at one edge 172 of the cylindrical member 164. The length of the auxiliary connecting shaft 152 is such that when the piston 72 is at the bottom dead center position, the end 174 of auxiliary connecting shaft 152 will be received in notch 168. There is also provided a mounting member, denoted generally by the reference character 180 which corresponds in function to the member 108 described with reference to FIG. 5. Shaft 166 is journaled for rotation in bearings 182 provided in member 180. Since member 180 is fixed with regard to the stationary part of the motor, oscillatory movements of the piston 72 will cause rotation of the shaft 166 since the eccentric arrangement described above functions as a cranking member. Member 180 is of generally rectangular configuration and bent forward at 184 to provide a forwardly extending portion 186. Spring 188 is connected between forwardly extending portion 186 and main crank shaft 150 biasing the main crank shaft member 150 toward the portion 186 and tending to prevent piston 72 stopping at top dead center or bottom dead center positions. Thus, if the motor should stop with the piston at top dead center position and with the direction of rotation as shown, spring 188 would pull connecting shaft 150 toward member 186 against the normal direction of rotation until piston 72 is approximately midway between top dead center position and bottom dead center position. It is to be noted that this is a very favorable starting position.

It will be noted that the auxiliary connecting shaft 152 is biased against the cylindrical member 164, suitably by a leaf spring 190 connecting the main connecting shaft 150 to the auxiliary connecting shaft 152. The auxiliary connecting shaft insures that rotation of shaft 166 will be in the proper direction and also provides an auxiliary starting force if the piston 72 should stop at the bottom dead center position. Thus, if shaft 166 should be driven in a direction opposite that shown, the end 174 of the auxiliary connecting shaft will fall into notch 168 preventing further rotation in the undesired direction. It is to be noted that at the time the end 174 engages the notch 168, the piston will be at the bottom dead center position and the amount of power applied to the piston will be at its maximum. As the piston 72 moves up, the auxiliary crankshaft 152 which is tightly connected to pin 154 will be driven against notch 168 to cause rotation of the cylindrical member 164 and shaft 166. It will be further noted that during the initial movement of shaft 72 from bottom dead center position, pin 154 will move in slot 154 formed in the main connecting shaft 150 such that force will not be pressed against the main connecting shaft 150 until after the auxiliary connecting shaft 152 has produced sufficient movement of the cylindrical member 162 to move it away from the bottom dead center position and into a favorable position from the standpoint of producing rotation of shaft 166 in the desired direction and also for the application of force to cause rotation of shaft 166. It will, therefore, be apparent that by utilizing an arrangement such as that shown in FIGS. 8—10 starting of a motor when rotational motion is desired is expedited and assurance is provided that rotation will be in the desired direction. In practice, however, it has been found that the more complex mechanism of FIGS. 8—10 is not required. Provision of a spring alone, or even a rubber band, to cause the shaft to come to rest at a point midway between the top and bottom dead center positions, which is the most favorable starting position, is sufficient in most applications.

Figure 11:
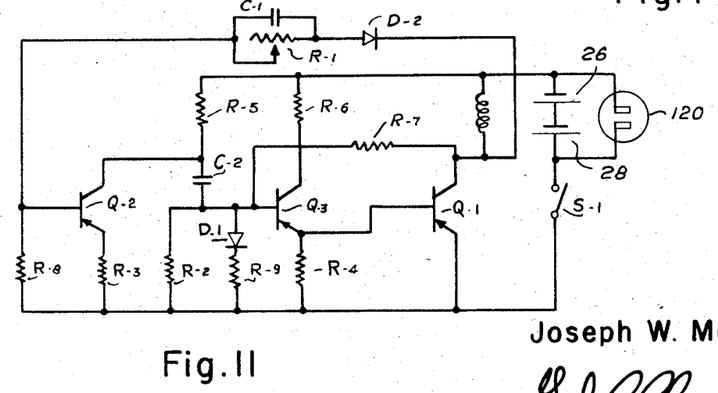
FIG. 11 is a schematic diagram illustrating one control circuit for use in practicing the present invention.

A control circuitry for producing the flow of direct current through the coil 74 in a desired direction and at desired times is shown in FIG. 11 of the drawings. It can be seen to comprise a transistor $Q_1$ whose collector and emitter are connected in a series circuit with the coil 74, the series connected batteries 26 and 28, and switch $S_1$. When switch $S_1$ is open, the load circuit through the batteries will be open and the motor will not be operated. However, upon closure of switch $S_1$, current will flow through the winding 74 of coil 14 from batteries 26 and 28, with the amount of current flow being a function of the conductivity state of the transistor $Q_1$.

The control circuit of FIG. 11 can also be seen to comprise a capacitor $C_1$ and resistor $R_1$ that are connected in parallel between the collector of transistor $Q_1$ and the base of transistor $Q_2$. The collector of transistor $Q_2$ is connected through capacitor $C_2$ and resistor $R_2$ to the positive terminal of battery 28, which is denoted as being at ground potential. The juncture between capacitor $C_2$ and resistor $R_2$ is connected to the base of transistor $Q_1$. The emitter of transistor $Q_2$ is connected to common through resistor $R_3$, and the emitter of transistor $Q_3$ is connected to common through resistor $R_4$. The collector of transistor $Q_2$ is connected to the negative side of battery 26 through resistor $R_5$, and the collector of transistor $Q_3$ is connected to the negative side of battery 26 through resistor $R_6$. The base of transistor $Q_3$ is connected to common through diode $D_1$ and to the collector of transistor $Q_1$ through resistor $R_7$. The base of transistor $Q_2$ is connected to common through resistor $R_8$. There is also suitably provided a receptacle 120 through which a charging current can be applied to the batteries 26 and 27 when the motor is not in use.

When the motor is running, the control circuitry shown schematically in FIG. 11 is effective to bias transistors $Q_1$ and $Q_3$ off upon the coil 14 reaching its point of maximum excursion into the magnetic structure 12 (bottom dead center), momentarily preventing flow of current through the coil 14 and permitting the coil 14 to be returned to its opposite dead center position. During this period of time, transistor $Q_2$ will be biased on. Upon the coil attaining a maximum excursion out of the airgap (hereinafter referred to as the top dead center position), transistor $Q_2$ will be biased off and transistors $Q_3$ and $Q_1$ will be biased to the conductive state with transistor $Q_1$ preferably being biased into saturation. When transistor $Q_1$ is biased conductively, current will flow through coil 14 to again cause the coil to be forced into the airgap to the bottom dead center position.

The current flowing through coil 14 is a function of the battery voltage, the DC resistance of the coil, the conductivity state of transistors $Q_1$ and $Q_3$, and the charge on capacitor $C_2$ as controlled by the back e.m.f. generated in coil 14. In accordance with the circuit of FIG. 11, the amount of base current flowing initially in transistor $Q_1$, as the coil moves from top dead center to bottom dead center is sufficient to bias the transistor such that the emitter-collector current will be limited only by the maximum current that can flow through the coil.

Figure 12:
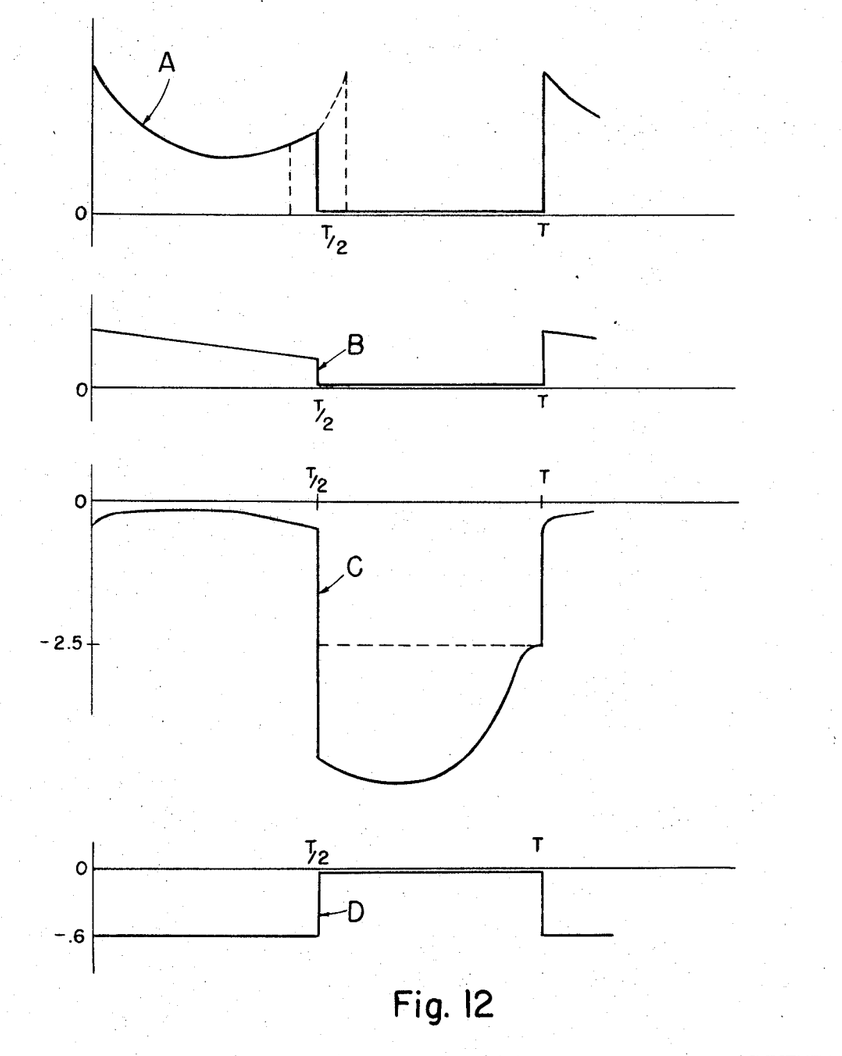
FIG. 12 is a group of curves illustrating various waveforms present in the control circuitry of FIG. 11.

Thus, when transistor $Q_1$ is first biased on, it is biased such that approximately the maximum amount of collector current will flow in transistor $Q_1$, as illustrated in Curve A of FIG. 12. The collector of transistor $Q_1$ will be very near ground potential and transistor $Q_2$ will either be biased off, or biased on so slightly that it will not substantially affect charging of capacitor $C_2$. It will be noted that the base current flowing in transistor $Q_1$ flows through the emitter-collector circuit of transistor $Q_3$ and that the base current of transistor $Q_3$ flows to charge capacitor $C_2$. The base current flowing in transistor $Q_1$ will, therefore, be an initially high level, but will slowly decrease as shown in Curve B of FIG. 12, due to charging of capacitor $C_2$. As the coil moves from its top dead center position to the bottom dead center position, a back e.m.f. voltage will be produced in the coil as its windings pass through the airgap of the permanent magnet, causing the collector current to decrease as shown in Curve A of FIG. 12. However, as the coil passes the midway point between the bottom dead center position and the top dead center position, the speed of the coil will decrease, resulting in an increase in the collector current of transistor $Q_1$ due to the decrease in back e.m.f. At bottom dead center, the coil will momentarily stop its movement, resulting in the absence of back e.m.f. voltage.

The time constant for the charge path of capacitor $C_2$ and the current amplification factor of transistors $Q_1$ and $Q_3$ are chosen such that at this time the relationship between the decreasing base current of transistor $Q_1$ and increasing collector current of transistor $Q_1$ is such that transistor $Q_1$ is only slightly saturated. The collector of transistor $Q_1$ will accordingly become more negative, as shown in Curve C of FIG. 12, resulting in an increase in the conductivity of transistor $Q_2$. It will be noted in this connection that transistor $Q_3$ provides current amplification of the charging current of capacitor $C_2$ to insure that the base current of transistor $Q_1$ derived from charging of capacitor $C_2$ will be sufficient to produce saturation of transistor $Q_1$. If the current flowing to charge capacitor $C_2$ is sufficient to bias transistor $Q_1$ into saturation, it is practical to connect the base of transistor $Q_1$ directly to capacitor $C_2$ with other minor circuit changes, permitting elimination of transistor $Q_3$.

When transistor $Q_2$ is biased to a higher conductivity state, it will provide a path for discharge of capacitor $C_2$ through diode $D_1$, resistor $R_3$ to the end of resistor $R_3$ which is connected to the emitter of transistor $Q_2$. At this point the discharge current splits into two components—one component flows through the emitter-hose of transistor $Q_2$, resistor $R_1$, diode $D_2$, the coil 14, resistor $R_5$ and back into the capacitor $C_2$. This component drives the transistor $Q_2$ as a common hose made such that a second component of discharge current, slightly smaller than the first, flows through the emitter-collector of transistor $Q_2$ and back into capacitor $C_2$. At the capacitor $C_2$ is discharged, the base of transistor $Q_3$ will become positive, as shown in Curve A of FIG. 13, causing transistor $Q_3$ to be biased off. When transistor $Q_3$ is biased off, transistor $Q_1$ will also be biased off and current will no longer flow through coil 14. It will be noted that the less conductive transistor $Q_1$ becomes, the more conductive transistor $Q_2$ will become biased. Similarly, the more conductive that transistor $Q_2$ becomes, the less conductive that transistors $Q_3$ and $Q_1$ will be biased. Accordingly, once transistor $Q_2$ begins to turn on, an avalanche effect is produced to cause a very fast switching in the state of conductivity of transistor $Q_1$ which controls the flow of current through coil 74. Thus, as shown in Curve C of FIG. 12, the collector of transistor $Q_1$ will change from a potential only slightly negative to a potential substantially equal to the voltage of the batteries 26 and 28 and thereafter will become more negative due to the back e.m.f. generated as the coil moves back to its initial bottom dead center position.

It will be noted that the coil will be returned to its initial or top dead center position due to the effect of one or more forces including attraction of the magnet for the ferrous material suitably comprising the coil form 76, the inertia of the crank members and load if a rotating load is driven, and the biasing effect of the resilient members 42 and 44.

When the coil is returned to its initial or top dead center position, a back e.m.f. will no longer be generated in the coil and the transistor $Q_2$ will become much less conductive. Upon this occurrence the collector of transistor $Q_2$ will become more negative, and capacitor $C_2$ will begin to be charged through the base-emitter circuit of transistor $Q_3$, biasing transistor $Q_3$ on. As a result of the flow of base current in transistor $Q_3$ to charge capacitor $C_2$, current will commence to flow in the emitter-collector circuit of transistor $Q_3$, providing base current for the transistor $Q_1$. A small amount of base current flowing in transistor $Q_1$ will result in a substantial decrease in the negative potential of the collector of transistor $Q_1$, causing transistor $Q_2$ to become less conductive and causing both transistors $Q_3$ and $Q_1$ to become more conductive. Thus, the decrease in the conductivity of transistor $Q_2$ occasioned by a drop in the back e.m.f. voltage generated in coil 74 when the coil returns to the top dead center position will produce an avalanche effect that results in transistor $Q_1$ being biased to saturation and transistor $Q_2$ being biased off. The cycle of operation will thereafter repeat itself until the switch $S_1$ is opened to remove potential from the circuit.

Figure 13:
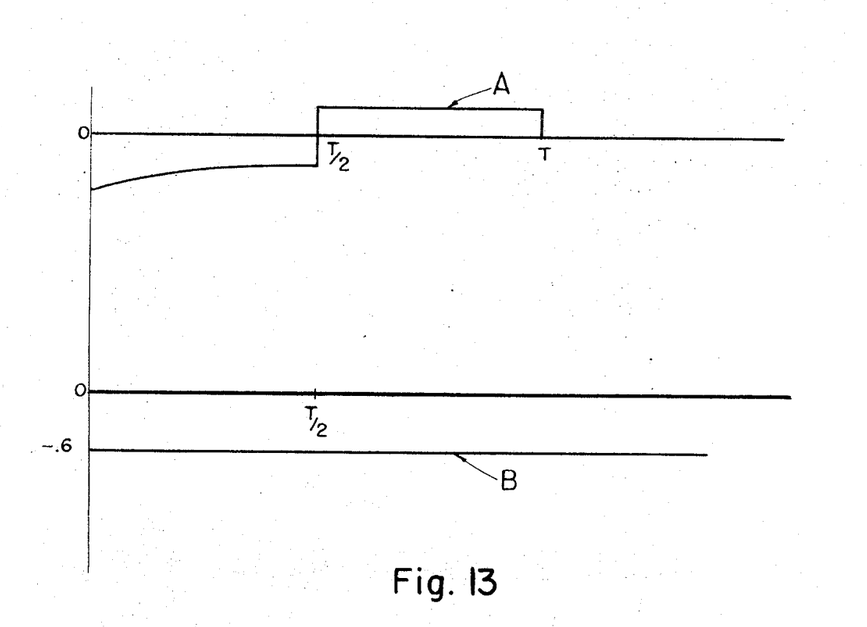
FIG. 13 is a group of curves illustrating additional waveforms present in the control circuitry of FIG. 11.
Figure 14:
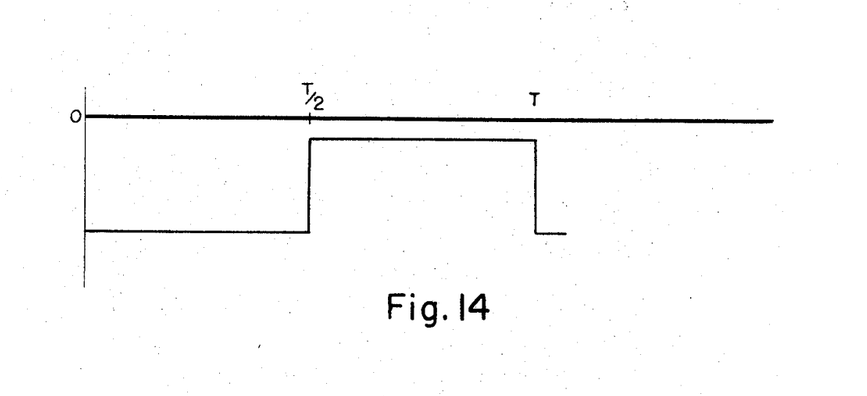
FIG. 14 is a curve illustrating still another waveform appearing in the control circuit of FIG. 11.

The above operations can perhaps more fully be understood by reference to the curves of FIGS. 13 and 14 of the drawings. Thus, the voltage appearing at the base of transistors $Q_3$ will initially be at the maximum negative level, but will become more positive as a result of the charging of capacitor $C_2$. At the time the transistor $Q_2$ is biased conductively permitting a discharge of capacitor $C_2$, the voltage appearing at the base of transistor $Q_3$ will be positive by the amount of forward voltage drop of diode $D_1$ and resistor $R_9$, all as shown in Curve A of FIG. 13. The voltage appearing at the base of transistor $Q_2$ will be of substantially the same form as the voltage appearing at the collector of transistor $Q_1$. The voltage appearing at the collector of transistor $Q_2$ will be as shown in FIG. 14. Thus, when transistor $Q_2$ is not conductive, its collector can be at a negative potential equal to the battery voltage less the drop across resistor $R_5$ as capacitor $C_2$ charges. When transistor $Q_3$ becomes conductive, its collector will become much more positive due to the voltage drop across resistor $R_5$, and will only be slightly negative during the conductive period of the transistor if transistor $Q_2$ saturates. If transistor $Q_2$ does not saturate, the potential appearing at its collector will essentially be of the form of the back e.m.f.

The base current of transistor $Q_1$ is as shown in Curve B of FIG. 12. When transistor $Q_1$ is conductive, its base will be more negative than its emitter by the amount of the drop across the emitter-base junction, causing the base of transistor $Q_1$ to be at approximately $-0.6$ volts for germanium transistors when the transistor $Q_1$ is conductive. When transistor $Q_1$ is biased off, on the other hand, its base will be at very near ground potential, all as shown in Curve D of FIG. 12.

It will be noted that the capacitor $C_1$ speeds up the turn-on and turn-off times of transistor $Q_1$. It will also be noted that when the coil is being returned from bottom dead center to top dead center, the back e.m.f. generated during this period of time will cause the collector of transistor $Q_1$ to be more negative than the battery supply, resulting in an increase in the amount of base current flowing through transistor $Q_2$. The collector of transistor $Q_2$ will be only slightly negative, resulting in discharge of capacitor $C_2$ through diode $D_1$, resistor $R_9$, and the two discharge paths through transistor $Q_2$. When top dead center is reached and the back e.m.f. generated disappears, transistor $Q_2$ will be biased less conductive, and its collector will become more negative. Capacitor $C_2$ will be charged through the base-emitter circuit of transistor $Q_3$. Since capacitor $C_2$ is permitted to charge from a voltage essentially determined by the amplitude and duration of the back e.m.f. towards the battery voltage, the base current of transistors $Q_1$ and $Q_3$ are dynamically and regeneratively controlled. This is extremely important in that it permits acceleration of the motor.

It will be appreciated that the curves of FIGS. 12—14 referenced above illustrate waveforms produced when switching of transistors $Q_1$ and $Q_2$ occurs at the top and bottom dead center position. Variation in the waveforms would be produced if switching occurred earlier or later.

The design of the motor is of necessity empirical. The optimum design is suitably attained by beginning with RC time constants approximately equal to the anticipated on time of transistor $Q_1$ and thereafter varying the component values to obtain optimum results. It will be apparent that the on-off cycle can be varied over a substantial range by adjustment of the charge and discharge time constants to obtain a degree of speed control. Other factors that affect the speed are, of course, the charging voltage and the current gain of transistors $Q_1$ and $Q_3$. It will also be noted that the design of a particular motor and circuit would be based upon a nominal supply voltage, and that a substantial deviation in the supply voltage below the nominal value would result in a substantial decrease in the motor speed and that the motor would cease to operate before total discharge of the cells.

It will be appreciated that the motor described in accordance with this preferred embodiment of the invention is essentially comparable to a single piston motor. It is, therefore, desirable that provision be made for starting of the motor from either bottom dead center or top dead center or provision must be made to restore the piston to a position other than bottom dead center or top dead center. In accordance with the preferred embodiment of the invention, the circuit provides starting at either bottom dead center or top dead center by a mode of circuit operation in which current is applied to accelerate the coil at a frequency in the order of 100 to 200 cycles per second, which causes vibration of the connecting rod between the shaft 72 and the load. This mode of operation is enhanced by providing a small freedom for the armature to move when the load itself is not moving and generally, must be used in conjunction with a mechanical bias means which tends to remove the crank to a position other than top or bottom dead center. If the motor stalls at a position other than bottom dead center or top dead center, the mode of circuit operation is one wherein current is applied to accelerate the coil at a frequency of suitably in the order of 0.5 to 8 cycles per second until the motor starts. It will be noted that if the motor should stop at the bottom or top dead center positions and if the motor has been off for some time, capacitor $C_2$ will normally be discharged.

It will be appreciated, however, that the most favorable starting position is when the motor is stopped at other than bottom or top dead center and, accordingly, it is desirable that provision be made to restore the crank to a position other than top or bottom dead center when the motor is not in operation, such as described with reference to FIGS. 8—10. It will also be noted that in small motors, a rubber band 73 extending between the articulating member and a fixed member provides excellent results. As described previously, if the motor should tend to stop in the bottom or top dead center position, the biasing effect of the resilient member would provide sufficient force to pull the connecting rod toward the fixed member, causing shaft 72 to move to a position half way between the bottom dead center and top dead center positions such that the connecting articulating member will be in position close to the fixed member. It will be noted that the only two positions in which a resilient member connected as described will not exert force on the connecting rod 102 is when the connecting rod 102 is half way between the bottom and top dead center positions with the connecting rod either in position closest or farthest away from the fixed member. It will be noted that utilization of resilient member 73 does not result in substantial drag forces on the operation of the motor since energy is stored when the resilient member is extended and released when it returns to its original length.

When power is applied to the motor as a result of closure of the switch $S_1$, current will flow in the base-emitter circuit of transistor $Q_3$ to charge capacitor $C_2$ biasing transistor $Q_1$ and current will flow through the coil 14. However, if the coil is at bottom dead center position, the crank may not turn initially and after a small amount of movement of the coil (which is preferably accentuated by permitting a small amount of slack in the linkage connecting the coil to the load) the motion of the coil will be restrained. Even a small movement of the coil will produce some back e.m.f., however, and when the movement of the coil stops, this decrease in back e.m.f. will cause transistor $Q_2$ to be biased on permitting discharge of capacitor $C_2$. It will be noted that due to the extremely short period of time that transistor $Q_3$ and transistor $Q_1$ were conductive, the capacitor $C_2$ will not have received a substantial charge. The coil will be returned to its initial position as a result of action of the forces mentioned before and when movement of the coil again stops, transistor $Q_2$ will be biased to a less conductive state and capacitor $C_2$ will begin to charge, permitting transistors $Q_3$ and $Q_1$ to again be biased on. The cycle will be repeated at a frequency suitably in the order of 200 cycles per second until the load has been vibrated off of the dead center position. It can be seen that the above starting cycle is quite similar in operation to that when the motor is running, the difference being in the amount of traverse of the coil 14.

At such time as the load moves away from dead center position, or if power is applied to the motor with the coil positioned between bottom and top dead center, at such time as the transistor $Q_1$ is rendered conductive, current will flow in transistor $Q_1$ so long as base-emitter current flows in transistor $Q_3$ to charge capacitor $C_2$. However, if the motor should become stalled between bottom and top dead center, capacitor $C_2$ will be charged to the potential at the collector of transistor $Q_2$.

It will be noted that due to the absence of back e.m.f. generated in the coil 14 the potential appearing at the collector of transistor $Q_1$ will be substantially battery potential and transistor $Q_2$ will be biased on to some extent determined by the ratio of resistors $R_1$ and $R_8$. The collector of transistor $Q_2$ will, therefore, be at voltage less than battery potential determined by the ratio of resistances $R_5$ and $R_3$. Thus, in accordance with one specific example of the invention, during such conditions the collector of transistor $Q_2$ will be approximately one half of battery voltage of 1.25 volts. The potential which is a function of the ratio of resistances $R_2$ and $R_7$ will, therefore, be applied to the base of transistor $Q_3$. However, since the potential across the capacitor $C_2$ cannot change instantaneously, the base of transistor $Q_3$ will be at or near zero potential. The base of transistor $Q_3$ will only become more negative as a result of discharge of capacitor $C_2$ through the circuit comprising resistors $R_7$ and $R_5$ with the capacitor $C_2$ being discharged toward a potential established by the ratio of resistors $R_7$ and $R_2$. At such time as the potential at the base of transistor $Q_3$ achieves a level of approximately 0.4 volts as a result of discharge of capacitor $C_2$, transistor $Q_3$ will become biased permitting gate current to flow in transistor $Q_1$, resulting in the potential appearing at the collector of transistor $Q_1$ to decrease. As a result of decrease in the potential appearing at the collector of transistor $Q_1$, transistor $Q_2$ will be biased to a less conductive state, causing the potential appearing at the collector of transistor $Q_2$ to increase. Even though the potential will no longer be applied to the base of transistor $Q_3$ through the voltage divider network comprising resistors $R_7$ or $R_2$, increase in potential of the collector of transistor $Q_2$ will provide additional charge level for capacitor $C_2$, resulting in an increase in the flow of current through the base-emitter circuit of transistor $Q_3$ and in turn resulting in transistor $Q_1$ being driven still harder. This effect will continue until such time as capacitor $C_2$ is charged to approximately 2.0 volts or some voltage slightly less than that at which time the charging current flowing through the base of $Q_3$ becomes insufficient to maintain transistor $Q_1$ biased into saturation. Upon this occurrence, transistor $Q_2$ will become biased to a more conductive state, permitting discharge of capacitor $C_2$ to a level originally set by the circuit components. Upon this occurrence, current will not flow through the coil 14 until such time as the capacitor is discharged through resistor $R_7$ to a level sufficient that it can cause conduction of transistor $Q_3$. The resistance of resistors $R_7$ and $R_5$ is such that the cycle will be repeated at a frequency of approximately 5 to 8 cycles per second or at a frequency lower or higher as required for a particular motor or application.

The diode $D_2$ connected between the collector of transistor $Q_1$ and the base of transistor $Q_2$ is desirable from the standpoint that it increases the sensitivity of transistor $Q_2$ to back e.m.f. This is true because the threshold voltage required for forward conduction of the diode $D_2$ is satisfied by a steady state bias from the cells 26 and 28. The effect of the back e.m.f. on $Q_2$ is increased by the ratio of the forward voltage drop across the diode divided by the sum of the forward voltage drop across the diode plus the drop across resistor $R_1$. Further, if diode $D_2$ is utilized and diode $D_2$ and diode $D_1$ are of different energy gap materials, for example one being of germanium and the other being of silicon, provision of resistor $R_9$ becomes desirable. The resistor $R_9$ prevents a decrease in operating speed from the maximum attainable for a given magnetic structure, battery and load that would result from an unduly great depth of discharge of capacitor $C_2$. An unduly great depth of discharge of capacitor $C_2$ would result in more base current for transistors $Q_3$ and $Q_1$, but would not result in a greater current to the load because resistor $Q_1$ would be biased into saturation without the additional base current and any additional increase in base current would not result in a significant decrease in collector-emitter voltage drop when transistor $Q_1$ is in saturation. Under these conditions, an increase in base current to $Q_1$ will only result in a lengthening of the on cycle of transistor $Q_1$ with an attendant loss of speed and efficiency.

It will be apparent that it is desirable that the proper relationship be established between the back e.m.f. generated and the depth of discharge of capacitor $C_2$ to obtain maximum speed available under no load conditions. It will also be noted that the provision of the additional resistance of resistor $R_9$ is not degenerate as to transistor $Q_2$ as would be true in the case of additional resistance added to resistor $R_3$. Resistor $R_3$ provides DC stability for transistor $Q_2$. Although resistor $R_3$ is a part of the discharge path for capacitor $C_2$, the resistance of resistor $R_3$ must be chosen with consideration given to the collector voltage of transistor $Q_2$.

Thus, it can be seen that the control circuit provided in accordance with FIG. 11 of the drawing is one having essentially three modes of operation. If even slight movement of the coil 14 is present, the conductive state of transistor $Q_1$, according to the power applied to the coil 14, will be controlled by the back e.m.f. generated by the coil. If the motor is running, the frequency at which the transistor is controlled on and off will be equal to a frequency at which the motor is operating. If, on the other hand, the motor is temporarily stalled at top dead center or bottom dead center position, movement of the coil is accentuated by any slack which may be provided in the drive train between the coil and the load, permitting accentuation of the coil movement relative to the load. Under such circumstances, capacitor $C_2$ will be charged relatively rapidly through the base-emitter circuit of transistor $Q_3$ and discharged relatively rapidly through the collector-emitter circuit of transistor $Q_2$. When the motor is at bottom dead center or top dead center, the frequency of operation of the control circuit can suitably be in the order of 200 cycles per second. In the event the coil is not moving, further instability is provided in the system such that power will be applied to the coil due to a biasing voltage applied to the base of transistor $Q_3$ from the collector of transistor $Q_1$. This biasing voltage will only become effective responsive to discharge of capacitor $C_2$. The third mode of instability is suitably effective at a frequency of approximately 5 to 8 cycles per second. It will be noted, however, that the period for application of power to the coil 14 as a result of the second mode of operation will normally be longer than that existing when the coil is oscillating at a relatively high frequency when at bottom dead center or top dead center.

In accordance with one specific example of the invention, the magnet 50 was an Alnico 5 magnet 1 inch long having an outside diameter of 1.5 inches and an inside diameter of 1 inch. The remainder of the magnetic structure was formed of Armco ingot iron with the members 54 and 58 being 0.1875 inch thick to provide a gap having an axial length equal to the thickness of the member 58. The mean gap diameter was 0.667 inch and the gap length was 0.042 inch. The coil 14 was wound on 0.002 inch brass shim stock that comprised three layers of No. 32 wire. The mean diameter of the coil was 0.667 inch and the length of the coil was five-sixteenths inch. The length of the wire in the gap at all times was 49 inches. The components utilized in the circuit of FIG. 8 were as follows:

| | |
|---|---|
| $Q_1$ | 2N457A |
| $Q_2$ | 2N1305 |
| $Q_3$ | 2N1305 |
| $D_1$ | IN458 |
| $D_2$ | IN458 |
| $R_1$ | 15,000 ohms |
| $R_2$ | 2,700 ohms |
| $R_3$ | 10 ohms |
| $R_4$ | 270 ohms |
| $R_5$ | 100 ohms |
| $R_6$ | 12 ohms |
| $R_7$ | 8,200 ohms |
| $R_8$ | 2,700 ohms |
| $R_9$ | Not used as diodes $D_1$ and $D_2$ of same material |
| $C_1$ | 0.001 microfarads |
| $C_2$ | 100 microfarads |
| Battery Voltage | 2.5 volts |

The no load speed of this motor was 8,400 r.p.m. with a stroke of five thirty-seconds inch when used with the crank arrangement of FIG. 5. The input power applied to the motor was 3.75 watts and the motor produced 0.0025 hp. of power for a 50 percent efficiency.

In accordance with a second specific example of the invention, the magnet 50 was an Alnico 5 magnet having a length of 1.5 inches, an outside diameter of 2.5 inches and an inside diameter of 1.625 inches. The gap length was 0.048 inch and the end pieces 54 and 58 were formed of Armco ingot iron having a thickness of five-sixteenths inch providing an axial gap length of five-sixteenths inch. The mean diameter of the gap was 0.92 inch. The coil 14 comprised two layers of No. 26 wire wound on a coil form of 0.002 inch brass shim stock. The coil was nine-sixteenths inch long and had a mean diameter of 0.92 inch. The active length of the wire in the gap was 56½ inches. The control circuitry was identical to that described with regard to the above specific example except for the following:

| | |
|---|---|
| $Q_1$ | 2N2912 |
| $R_6$ | Not used |
| $R_1$ | 25,000 ohms The no load speed of this motor | was 6,000 r.p.m. and at an input of 7.5 watts the motor produced 0.005 hp. providing a 50 percent efficiency.

It can be seen from the foregoing description that it is important the current be applied to the coil at one extreme of its traverse and removed from the coil or reversed at the opposite extreme of the traverse. In accordance with a preferred embodiment of the control circuitry disclosed herein, this necessary control function is derived as a function of the back e.m.f. developed in the coil as it moves. In this connection, it will be noted that it is desirable that the transistor $Q_2$ not be biased into saturation in the absence of back e.m.f. During the flyback part of the cycle, the potential appearing at the collector of transistor $Q_1$ will become more negative than the potential of the batteries as a result of the back e.m.f. generated in the coil. This, in turn, causes transistor $Q_1$ to be biased to a more conductive state and increases the depth of discharge of capacitor $C_2$. When top dead center is reached and the back e.m.f. disappears, capacitor $C_2$ charges through the base-emitter circuit of transistor $Q_3$ rather than discharging through resistor $R_2$ as the collector of transistor $Q_3$ becomes more negative. This, of course, permits greater base current to flow in transistor $Q_3$ by permitting capacitor $c_2$ to charge from a relatively low voltage towards the battery voltage as it affects the conductive state of transistor $Q_1$ and permits and promotes acceleration of the motor.

As also noted by the above, the speed of the motor will be basically a function of the applied voltage and the load impressed on the motor for a given magnetic structure and cranking arrangement. However, some speed control can be obtained by varying the time constant of the $C_2$, $R_5$ charging circuit and the speed can be limited by biasing $Q_2$ such that the back e.m.f. generated at a desired maximum speed will produce saturation of transistor $Q_2$.

Figure 15:
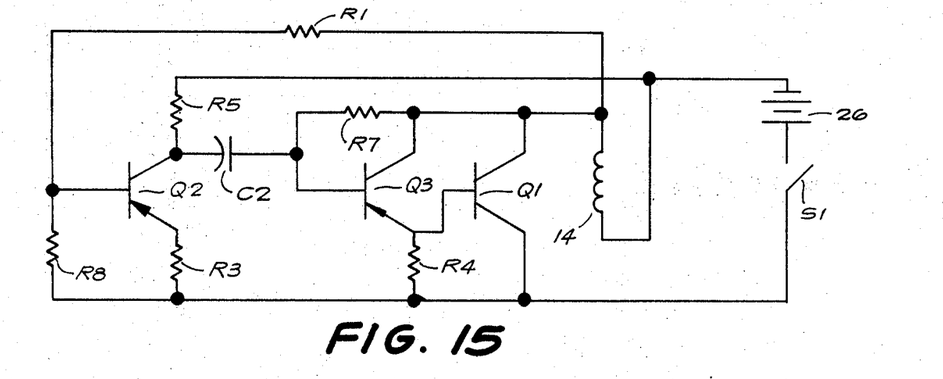
FIG. 15 is a schematic diagram illustrating another control circuit.
Figure 16:
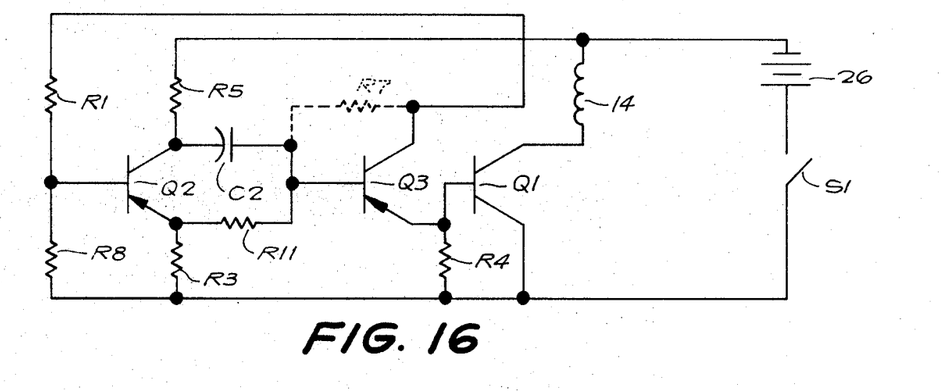
FIG. 16 is a schematic diagram illustrating still another control circuit.
Figure 17:
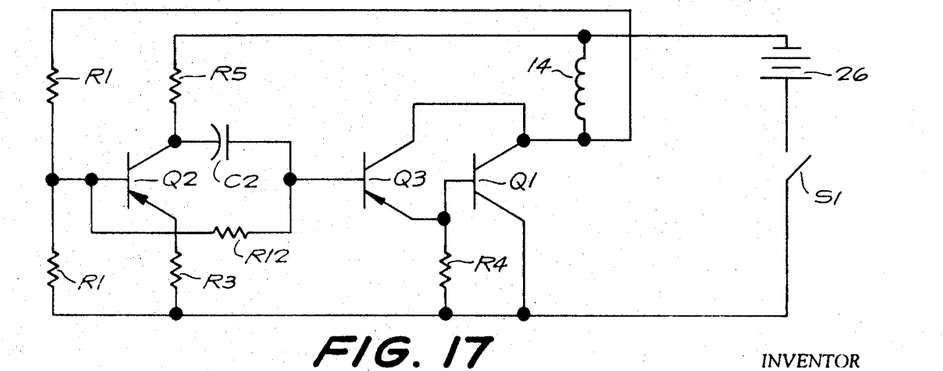
FIG. 17 is a schematic diagram illustrating still another control circuit.

Alternative control circuits in which different discharge paths for capacitor $C_2$ are utilized are shown in FIGS. 15 through 17 of the drawings. However, the control circuits of FIGS. 15 through 17 have in common with the control circuitry of FIG. 11 the fact that they include a first transistor which is connected by its emitter and collector electrodes in series with the coil and a source of direct current supply voltage, a second transistor having emitter base and collector electrodes and a capacitor. The conductivity state of the second transistor is controlled as a function of potential appearing at one of the electrodes of the first transistor, the state of charge of the capacitor is controlled as a function of the conductivity state of the second transistor and the conductivity state of the first transistor is controlled as a function of the state of charge of the capacitor. It will be noted, in this connection, that reactance elements other than capacitors can be used, such as an inductor, although, in general, it has been found that capacitor is preferred due to considerations of size and simplicity of circuit design.

FIGS. 15—17 also indicate the use of transistor $Q_3$ and $Q_1$ as a composite transistor eliminating the resistor $R_6$ of FIG. 11. Operation of transistors $Q_3$ and $Q_1$ as a composite pair results in economy of cost by eliminating resistor $R_6$ and economy of power since the current taken by transistor $Q_3$ also passes through the coil. There is a significant power savings even though transistor $Q_1$ operates at a higher saturation drop in the composite connection.

The circuit of FIG. 15 can be seen to be the same schematically as the circuit of FIG. 11 except for the elimination of diodes $D_1$ and $D_2$, the elimination of capacitor $C_1$ and the elimination of resistors $R_2$, $R_8$ and $R_9$ with the collector of transistor $Q_3$ being connected directly to the collector of transistor $Q_1$. It is important to note further that in the circuit of FIG. 15, the discharge path for capacitor $C_2$ is through a path comprising a resistor $R_7$, the coil 14 and resistor $R_5$. The capacitor is not discharged through the base-emitter or emitter-collector electrodes of transistor $Q_2$, but the charge on the capacitor is controlled as a function of the conductivity state of transistor $Q_2$ in that the charge on the capacitor is controlled as a function of the potential appearing at the collector of transistor $Q_2$, which in turn varies as a function of conductivity state of transistor $Q_2$, which in turn varies as a function of conductivity state of transistor $Q_2$. Accordingly, even though the discharge path is different, the conductivity state of the transistor $Q_2$ controls the state of charge of the capacitor. As described with reference to FIG. 11, the resistor $R_7$ also functions as a starting resistor by providing a path for discharge of capacitor $C_2$, when transistor $Q_2$ is not conductive, through resistor $R_5$ and coil 14.

The control circuit of FIG. 16 is substantially the same as that of FIG. 15, the difference being that resistor $R_7$ is eliminated and resistor $R_{11}$ is connected between the emitter of transistor $Q_2$ and the base of transistor $Q_3$. In the embodiment of the invention shown in FIG. 16 of the drawings, the capacitor $C_2$ discharges through one path comprising the emitter-collector electrodes of transistor $Q_2$ and resistor $R_{11}$ and through a second path comprising resistor $R_{11}$, resistor $R_1$, the emitter-hose electrodes of the transistor $Q_2$, the coil 14 and resistor $R_5$. Again, even though the discharge path for capacitor $C_2$ is different, the basic consideration of the state of charge of the capacitor being controlled as a function of the conductivity state of the capacitor $C_2$ remains. In FIG. 16 the starting cycle may be set up from resistor $R_{11}$ and the potential appearing at the emitter of transistor $Q_2$. Resistor $R_7$ may be connected as shown in phantom to provide improved starting characteristics, but is not necessary.

The control circuit of FIG. 17 is similar to that of FIG. 16, the difference being that the resistor $R_{11}$ is eliminated and resistor $R_{12}$ is connected between the base of transistor $Q_2$ and the base of transistor $Q_3$. In this instance, the discharge path for capacitor $C_2$ is through resistor $R_{12}$, resistor $R_1$, coil 14 and resistor $R_5$. Again, the state of charge of the capacitor is determined by the potential appearing at the collector of transistor $Q_2$.

Although the invention has been described with reference to particular preferred embodiments thereof, many changes and modifications will become apparent to those skilled in the art in view of the foregoing description. For example, different control circuits can be used or it would be possible to provide an additional circuit for causing current to flow through the coil in a direction to return the coil to its original position as a result of magnetic forces set up by such current flow in the coil rather than depend upon inertia or a restoring spring member or the attraction of the permanent magnetic structure for a shim stock. Also, in those applications where substantial power is required, it would be feasible to utilize a crankshaft in which a plurality of such motors were coupled, much in the manner of a gasoline engine having several pistons.

I claim:
1. A direct current motor comprising:
 a. an armature coil;
 b. a magnet structure having an airgap adapted to receive said coil;
 c. means positioning said coil for movement in said airgap;
 d. a first transistor having emitter, base and collector electrodes;
 e. means connecting said first transistor by said emitter and collector electrodes in series with said coil and a source of direct current supply voltage;
 f. a second transistor having emitter, base and collector electrode;
 g. means responsive to the potential appearing at one of the emitter and collector electrodes of the first transistor for controlling the conductivity state of the second transistor;
 h. a capacitor having two terminals;
 i. means connecting one terminal of the capacitor to one of the emitter and the collector electrodes of the second transistor;
 j. means connected to the capacitor terminals for providing charge and discharge paths for said capacitor whereby the charge on the capacitor varies as a function of the potential appearing at said one of the electrodes of the second transistor; and
 k. means responsive to the capacitor being charged and discharged for controlling the conductivity state of the first transistor;

2. A motor as defined in claim 1 further including a first shaft carried by a coil and extending along the axis of said coil, a cranking member having a second shaft, means supporting said second shaft for rotation, and means coupling said cranking member to the first mentioned shaft whereby reciprocating movement of said first shaft produces rotation of the second shaft and said cranking member establishes the excursion of said first shaft and coil.

3. A motor as defined in claim 1 further including means for connecting the base electrode of said second transistor to one of the emitter and collector electrodes of the first transistor.

4. A motor as defined in claim 1 including means connecting said second transistor by its emitter electrode in a discharge path for said capacitor and means for supplying base current to said first transistor as said capacitor is charged.

5. A motor as defined in claim 4 wherein said means for supplying includes a third transistor having base, emitter and collector electrodes and means connecting said third transistor to amplify the charge current of said capacitor and to apply the amplified current to drive said first transistor.

6. A motor as defined in claim 4 wherein said means connecting said second transistor includes a diode and at least one resistor.

7. A motor as defined in claim 1 wherein the potential appearing at the one electrode varies as a function of the back e.m.f. generated as said coil moves in a magnetic field.

8. A motor as defined in claim 4 wherein the discharge time constant of said capacitor when said second transistor is biased on is less than the charge time constant.

9. A motor as defined in claim 4 further including means connecting said capacitor to provide an additional discharge path through said coil.

10. A direct current motor as defined in claim 1 wherein the means connected to the capacitor terminals for providing a charge path for said capacitor includes the base-emitter circuit of one of a third transistor and said first transistor.

11. A direct current motor as defined in claim 1 wherein the potential appearing at the one electrode varies as a function of the conductivity state of the second transistor and further including means connected to the other terminal of the capacitor for supplying base current to the first transistor as said capacitor is charged.

12. A direct current motor as defined in claim 1 wherein the at least one discharge path for said capacitor includes means connecting the base-emitter circuit of the second transistor in series with said coil and resistor means.

13. A direct current motor as defined in claim 12 including another discharge path for said capacitor through a series circuit comprising said coil and resistor means shunting the base-emitter circuit of said second transistor.

14. A direct current motor as defined in claim 1 wherein the at least one discharge path includes resistor means connected in series with said coil across said capacitor.

15. A direct current motor as defined in claim 1 wherein the at least one discharge path includes first resistor means connecting one terminal of the capacitor to one terminal of the coil and second resistor means connecting the other terminal of the capacitor to another terminal of the coil 16. A direct current motor as defined in claim 1 further including means for limiting the traverse of said coil.